US012767404B2

(12) United States Patent
Chen et al.

(10) Patent No.: US 12,767,404 B2
(45) Date of Patent: Oct. 20, 2026

(54) BIODEGRADABLE MATERIALS FOR USE IN PACKING, STORAGE AND SHIPMENT

(71) Applicants: Cindy Chen, Marietta, GA (US); Piper Alexandra Pearson, Marietta, GA (US)

(72) Inventors: Cindy Chen, Marietta, GA (US); Piper Alexandra Pearson, Marietta, GA (US)

( * ) Notice: Subject to any disclaimer, the term of this patent is extended or adjusted under 35 U.S.C. 154(b) by 149 days.

(21) Appl. No.: 18/172,749

(22) Filed: Feb. 22, 2023

(65) Prior Publication Data

US 2023/0406587 A1 Dec. 21, 2023

Related U.S. Application Data

(60) Provisional application No. 63/312,784, filed on Feb. 22, 2022.

(51) Int. Cl.

| | |
|---|---|
| ***B65D 65/46*** | (2006.01) |
| ***B29C 44/02*** | (2006.01) |
| ***B65D 81/09*** | (2006.01) |
| *B29K 105/04* | (2006.01) |

(52) U.S. Cl.

CPC ............ *B65D 65/466* (2013.01); *B29C 44/02* (2013.01); *B65D 81/09* (2013.01); *B29K 2003/00* (2013.01); *B29K 2105/046* (2013.01); *B65D 2581/056* (2013.01)

(58) Field of Classification Search

CPC ........ B65D 65/466; B65D 81/09; B29C 44/02
USPC .......................................................... 428/159
See application file for complete search history.

(56) References Cited

U.S. PATENT DOCUMENTS 4,863,655 A * 9/1989 Lacourse ................ C08B 30/20 106/206.1
5,922,379 A * 7/1999 Wang ...................... B29B 7/007 106/162.51
2021/0345803 A1* 11/2021 Greenberg ............. A47G 21/18

* cited by examiner

*Primary Examiner* — Tahseen Khan
(74) *Attorney, Agent, or Firm* — Wilmer Cutler Pickering Hale and Dorr LLP

(57) ABSTRACT

The invention(s) disclosed herein relate to improved methods and materials for manufacturing biodegradable, compostable filler materials for packing, shipping and storage. The filler materials disclosed herein are made of all-natural elements and may be manufactured from readily available food-waste or other plant-based waste materials. These materials are also rapidly decomposable and have a reduced environmental impact compared to other known packing materials.

9 Claims, 2 Drawing Sheets

BIODEGRADABLE MATERIALS FOR USE IN PACKING, STORAGE AND SHIPMENT

CROSS-REFERENCES TO RELATED APPLICATIONS

This application claims the benefit under 35 U.S.C. 119(e) to U.S. Provisional Patent Application No. 63/312,784, filed Feb. 22, 2022.

FIELD OF THE INVENTION

This invention relates to biodegradable materials for use as filler in shipping containers, such as boxes, mailers, bags, pouches, containers and envelopes, and other storage containers. More particularly, this invention relates to such filler materials, which are formed of readily available and biodegradable plant-derived fibers, thereby being environmentally friendly.

BACKGROUND

Large volumes of packing filler are produced and used to protect items in containers from damage during packing, shipping, or storage. These fillers are largely made of plastic or polystyrene, as they offer a desired compressibility. However, plastic or polystyrene are not biodegradable. The accumulation of such material in landfills and oceans is of major environmental concern. Therefore, there is a need for more environment friendly materials as substitute for plastics.

Starch materials offer several advantages over plastics used as packing fillers. Starch is manufactured from a natural renewable resource and is well known to be biodegradable. It has been used as packing foam filler as disclosed in U.S. Pat. Nos. 4,863,655, 4,900,361 and 5,252,271. However, starch is often in high demand and expensive.

Therefore, there remains a need for a biodegradable packing material that offers the desired compressibility and that can be manufactured inexpensively with raw material in an abundant and renewable manner.

SUMMARY

In various embodiments, the invention relates to rapidly biodegradable materials for packing, shipment and storage.

In various embodiments, the invention relates to a biodegradable packing material comprising a plant-based fibrous material, wherein the packing material has a plurality of closed cellular structures that provide compressibility. In various embodiments, the plant-based fibrous material is derived from corn husks. In various embodiments, the packing material further comprises starch. In various embodiments, the starch is a corn starch. In various embodiments, the plant-based fibrous material is derived from a corn husk. In various embodiments, the packing material further comprises starch. In various embodiments, the starch is cornstarch. In various embodiments the packing material has an uneven surface.

In various embodiments, the invention relates to a method of manufacturing a biodegradable packing material comprising, a) blending a cornhusk with 15 mls of water to form a paste; b) admixing to the paste, 7.5 grams of starch, 14.4 grams of carbonate material and 15 ml of a mild acid, wherein the mild acid is capable of reacting with carbonate material to generate gas, c) pouring the admixture of step b into a mold; and heating the admixture of step c. In various embodiments, the method further comprises the step of hydrating the corn husk. In various embodiments, the starch is cornstarch. In various embodiments, the mild acid is selected from acetic acid, citric acid and vinegar. In various embodiments the carbonate material is selected from sodium bicarbonate or sodium carbonate.

In various embodiments, the invention relates to a biodegradable packing material, wherein said biodegradable packing material is manufactured using a process comprising the following steps: a) blending a cornhusk with 15 mls of water to form a paste; b) admixing to the paste, 7.5 grams of starch, 14.4 grams of carbonate material and 15 ml of a mild acid, wherein the mild acid is capable of reacting with carbonate material to generate a gas; c) pouring the admixture of step b into a mold; and d) heating the admixture of step c. In various embodiments the method further comprises a step of hydrating the corn husk. In various embodiments, the starch is cornstarch. In various embodiments, the mild acid is selected from acetic acid, citric acid and vinegar. In various embodiments, the carbonate material is selected from sodium bicarbonate and sodium carbonate.

BRIEF DESCRIPTION OF THE FIGURES

Various objectives, features, and advantages of the disclosed subject matter can be more fully appreciated with reference to the following detailed description of the disclosed subject matter when considered in connection with the following drawings, in which like reference numerals identify like element.

FIG. 1 is a cross-sectional view of a spherical biodegradable packing material. The packing materials includes a foam body 100 which contains a plurality of closed cell structures 110 and an uneven surface 120.

DETAILED DESCRIPTION

It is to be understood that the phraseology and terminology employed herein are for the purpose of description and should not be regarded as limiting. The present invention provides biodegradable packing materials using industry or residential waste. The primary constituent of the invention is a plant-derived fibrous material. Such materials are commonly disposed of in industrial or residential waste and are biodegradable after use. In various embodiments, the plant-derived material is derived from corn husks.

Figure 1:
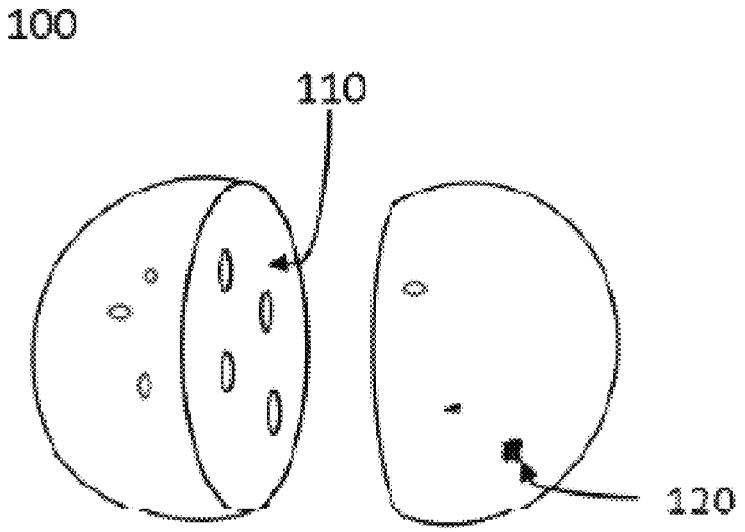
FIG. 1 shows an exemplary diagram of a spherical biodegradable packing material in accordance with some embodiments.

In various embodiments, the packing filler is depicted in FIG. 1, which provides a cross-sectional view of a spherical biodegradable packing material. The packing material includes a foam body 100 which contains a plurality of closed cell structures 110 and an uneven surface 120. In various embodiments, the body 100 can have a spherical, cylindric, peanut or rectangular shape. In various embodiments, the foam body comprises a plurality of closed cell structures 110, which provides the packing material with a relatively low density and increased compressibility. This feature offers a good property for protection during packing, shipping and storage.

In various embodiments, the surface of the packing material is uneven. The friction caused by the uneven surface facilitates stable transportation or storage of items contained in containers filled with the packing material of various embodiments.

A significant feature of the present invention is the ability to use biodegradable waste, rather than starch that must be manufactured. As used herein, the term "biodegradable" simply means that a product will eventually disintegrate into to innocuous material. The biodegradable packing materials are primarily composed of a plant-derived materials.

These materials may be obtained from any source, including but not limited to leftover plant-based fibrous materials from other uses. Such plant-based fibrous materials may include corn husks, banana peels, potato skins, watermelon shells, sugar cane, fruit and vegetable pulp, wood harvesting and milling materials, plant-based raw materials that were used in ethanol production, grain silage and milling remnants and the like wastes that might otherwise be composted. In various embodiments, the plant-derived material is a corn husk. Corn husk may be acquired in raw or unmodified form.

In various embodiments, the plant-derived material may be combined with starch to form the biodegradable packing filler. In various embodiments, corn husk-derived fibrous material may be combined with starch to form the biodegradable packing filler.

In various embodiments, the foam body comprises a plurality of closed cell structures 110. This feature offers a good property for protection during packing, shipping and storage. In various embodiments, the closed cellular structures may be generated by combining a carbonate material with an acid to form gas bubbles in the material during manufacture of the biodegradable packing materials. The carbonate and the acid are added to the corn husk-derived fibrous material. The resulting foam body has a relatively low density and increased compressibility.

Also provided herein are methods for manufacturing biodegradable packing materials. In various embodiments, the invention relates to reducing the plant-based fibrous material to a paste using water and admixing said paste with a starch material. In various embodiments, the plant-based fibrous material is derived from a corn husk. In various embodiments the corn husk is isolated from the corn plant and ground into a paste with one teaspoon of water. In various embodiments, other volumes of water or other liquids may be used to create the paste. In various embodiments, a starch is added to the paste. In various embodiments, the starch is cornstarch.

In various embodiments, the methods provided herein further involve using a gaseous reaction to generate closed cell structures 110 in the foam body 100 of the biodegradable materials. The compressibility of the biodegradable material is provided by these closed cell structures. In various embodiments, the gaseous reaction involves the reaction of an acid with a carbonate material. The specific type of carbonate material and mild acid are not critical, so long as the acid reacts with the carbonate material to release gas into the structure. Sodium carbonate or sodium bicarbonate are useful for this purpose. Acetic acid or vinegar are also useful for this purpose. Other types of carbonate materials or acid will also be known to those of ordinary skill in the art.

In various embodiments, the resulting mixture is then poured into a mold. The shape of the packing materials can be configured by the shape of the mold. The mold can be of any shape and/or size suitable for providing packing material or filler for packing, shipping and storage. For example, the mold may spherical, oval, rectangular, cubic, triangular, or peanut-shaped. In various embodiments, the packing material can be molded into sheets for shearing into ribbons or strips.

In various embodiments, the present invention relates to a method for producing a biodegradable packing material comprising the steps of: a) blending a corn husk with 15 ml of water into a paste; b) admixing to the paste, 7.5 grams of starch, 14.4 grams of carbonate material and 15 ml of a mild acid, wherein the mild acid is capable of reacting with carbonate material to generate gas, c) pouring the admixture of step b into a mold, and d) heating the admixture of step c. The admixture of step c may be heated using any technique known in the art. For example, in various embodiments, the admixture is heated in for 5, 8, 10, 15, 20, 25, 30 or 60 seconds in a heating device capable of generating electromagnetic radiation at microwave frequency (e.g., a microwave). For example, in various embodiments, the admixture is heated in for 20 seconds in a heating device capable of generating electromagnetic radiation at microwave frequency (e.g., a microwave).

In various embodiments, the process can require an additional step of hydration before step (a) by soaking the corn husk in water or other kinds of liquid.

In various embodiments, the present invention relates to a biodegradable packing material, wherein said biodegradable packing material is manufactured using a process comprising the following methods disclosed herein.

EXAMPLES

Example 1—Methods of Preparing Biodegradable Materials

Figure 2:
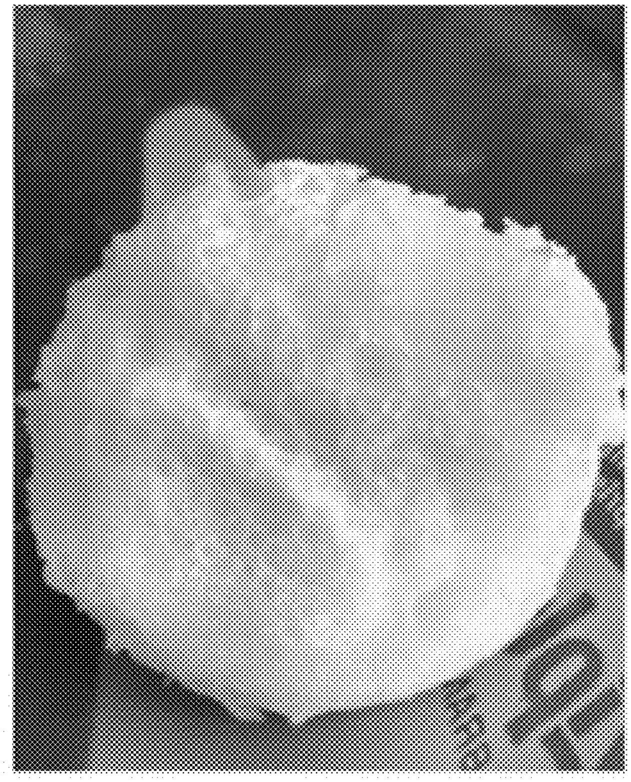
FIG. 2 shows an exemplary embodiment of the claimed invention.

In certain embodiments of the present invention, the packing materials are made from corn husks. Briefly, a corn husk was removed from the corn plant blended into a paste with 1 teaspoon of water. Next, 0.5 teaspoon of starch was added to the paste. One teaspoon of baking soda and one teaspoon of vinegar were added to the mixture in order to create gas bubbles which allowed the closed cellular structures to form in the material (see FIG. 1, 110), reducing the density and increasing the compressibility of the pack material. The mixture placed in a circular mold and was heated in a microwave for 15 to 20 seconds, until a foam material was formed. The resulting material is depicted in FIG. 2.

Example 2—Dissolvability of Biodegradable Materials

The materials disclosed in Example 1 have been demonstrated to be readily dissolvable in water. The biodegradable packing materials were placed in a container containing sufficient water such that the packing materials were fully submerged in water. The container was left undisturbed (i.e. the solution was not mixed or stirred) for six hours. After 6 hours, the biodegradable packing materials of Example 1 were fully dissolved.

The invention claimed is:

1. A method of manufacturing a biodegradable packing material, wherein the biodegradable packing material comprises a plant-based fibrous material and has a plurality of closed cellular structures that provide compressibility, wherein the plant-based fibrous material is derived from corn husks, wherein the packing material has an uneven surface, the method consisting essentially of, a) blending corn husks with water to form a paste, wherein 15 milliliters of water are added per one corn husk;

b) admixing to the paste, cornstarch, carbonate material and mild acid, wherein 7.5 grams of the cornstarch are admixed per one corn husk, wherein the mild acid is capable of reacting with carbonate material to generate gas;

c) pouring the admixture of step b into a mold; and d) heating the admixture of step c.

2. The method of claim 1, further comprising a step of hydrating the corn husks.

3. The method of claim 1, wherein the mild acid is selected from the group consisting of acetic acid, citric acid, and vinegar.

4. The method of claim 1, wherein the carbonate material is selected from the group consisting of sodium bicarbonate and sodium carbonate.

5. The method of claim 1, wherein 15 milliliters of the mild acid are admixed per one corn husk.

6. The method of claim 1, wherein 14.4 grams of the carbonate material are admixed per one corn husk.

7. The method of claim 1, wherein 15 milliliters of the mild acid are admixed per one corn husk, and 14.4 grams of the carbonate material are admixed per one corn husk.

8. The method of claim 1, wherein the corn husks are derived from all-natural corn.

9. The method of claim 1, wherein the corn husks are derived from a waste material.

* * * * *